United States Patent
Nishitani et al.

(10) Patent No.: US 11,352,899 B2
(45) Date of Patent: Jun. 7, 2022

(54) EMERGENCY SHUT-OFF DEVICE

(71) Applicant: MITSUBISHI HEAVY INDUSTRIES COMPRESSOR CORPORATION, Tokyo (JP)

(72) Inventors: Ken Nishitani, Hiroshima (JP); Abhay Jain, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 259 days.

(21) Appl. No.: 15/769,041

(22) PCT Filed: Dec. 17, 2015

(86) PCT No.: PCT/JP2015/085308
§ 371 (c)(1),
(2) Date: Apr. 17, 2018

(87) PCT Pub. No.: WO2017/104037
PCT Pub. Date: Jun. 22, 2017

(65) Prior Publication Data
US 2020/0240284 A1 Jul. 30, 2020

(51) Int. Cl.
*F01D 21/18* (2006.01)
*F01D 21/00* (2006.01)
(Continued)

(52) U.S. Cl.
CPC ........... *F01D 21/003* (2013.01); *F01D 21/18* (2013.01); *F01D 17/145* (2013.01);
(Continued)

(58) Field of Classification Search
CPC .......... F01D 21/18; F01D 21/16; F01D 21/00; F01D 17/145; F05D 2270/09;
(Continued)

(56) References Cited

U.S. PATENT DOCUMENTS

| 525,462 | A | * | 9/1894 | Jones | ..................... F15B 13/04 137/625.69 |
| 2,402,729 | A | * | 6/1946 | Buchanan | ......... F16L 55/02772 138/43 |

(Continued)

FOREIGN PATENT DOCUMENTS

| JP | S60-147703 U | 10/1985 |
| JP | S61-105356 A | 5/1986 |

(Continued)

OTHER PUBLICATIONS

Extended European Search Report in counterpart European Application No. 15910727.5 dated Oct. 26, 2018 (9 pages).

(Continued)

*Primary Examiner* — Craig J Price
(74) *Attorney, Agent, or Firm* — Osha Bergman Watanabe & Burton LLP

(57) ABSTRACT

An emergency shut-off device shuts off supply of control oil to a trip-and-throttle valve of a steam turbine and closes the trip-and-throttle valve in an emergency. The emergency shut-off device includes: a cylinder; a piston that slides into the cylinder; a spring that applies a biasing force to the piston; a plurality of piston valves disposed on the piston; and a plurality of chambers that are formed by the piston valves. The control oil is supplied to and drained from the plurality of chambers, and a sliding surface of each of the piston valves has a groove to leak the control oil in a corresponding one of the chambers to another one of the chambers that is adjacent to the corresponding chamber in an axis direction.

2 Claims, 10 Drawing Sheets

(51) Int. Cl.
*F01D 17/14* (2006.01)
*F16K 31/524* (2006.01)

(52) U.S. Cl.
CPC .... *F05D 2220/31* (2013.01); *F05D 2270/021* (2013.01); *F05D 2270/091* (2013.01); *F16K 31/52483* (2013.01); *Y10T 137/8671* (2015.04)

(58) Field of Classification Search
CPC ........... F05D 2270/091; F05D 2270/56; F05D 2220/72; F05D 2220/31; F05D 2270/023; Y10T 137/8663; Y10T 137/87217; Y10T 137/87193–87241; Y10T 137/86493–8671; Y10T 137/87169–87241; F15B 13/04; F15B 13/0401; F15B 13/0402; F15B 13/0403; F15B 13/0435; F15B 13/0407; F15B 2013/0409; F15B 2013/041; F15B 2013/0412; F15B 2013/0413; F15B 2211/40576; F16K 11/0708; F16K 11/0712; F16K 27/041; F16K 31/0613; F16K 31/0668; F16K 39/04; F16K 31/52483; F16K 31/52475
USPC ........................................................ 251/282
See application file for complete search history.

(56) References Cited

U.S. PATENT DOCUMENTS

| | | | | |
|---|---|---|---|---|
| 2,739,607 A * | 3/1956 | Murray | ............... | G05D 16/10 137/332 |
| 2,952,275 A * | 9/1960 | Mock | ............... | F16K 11/0708 137/625.42 |
| 3,018,041 A * | 1/1962 | Bidwell | ............... | G05D 16/101 235/200 R |
| 3,252,480 A * | 5/1966 | Odendahl | ............... | F16K 47/04 137/625.3 |
| 3,456,688 A * | 7/1969 | Clark | ............... | F15B 13/0431 137/625.63 |
| 3,460,577 A * | 8/1969 | Weathers | ............ | F16K 11/0708 137/625.69 |
| 3,677,362 A * | 7/1972 | Chatterjea | ............ | B62D 11/183 180/6.48 |
| 3,722,367 A * | 3/1973 | Clark | ............... | B63H 25/28 91/367 |
| 3,812,883 A * | 5/1974 | Yokokawa | .......... | F16K 11/0708 137/625.69 |
| 3,840,050 A | 10/1974 | Eggenberger | | |
| 3,875,849 A * | 4/1975 | Patel | ............ | F15B 9/08 91/367 |
| 3,923,240 A * | 12/1975 | Glaze | ............... | B60G 21/0553 280/124.13 |
| 4,069,843 A * | 1/1978 | Chatterjea | ........... | F16D 48/0206 137/625.69 |
| 4,099,588 A * | 7/1978 | Dezelan | ............... | B60K 17/10 137/625.66 |
| 4,122,868 A * | 10/1978 | Holloway | ........... | F16K 11/0708 137/625.3 |
| 4,139,985 A * | 2/1979 | Ruhl | ............... | B62D 11/183 137/625.69 |
| 4,245,816 A * | 1/1981 | Johnson | ............. | F16K 11/0708 251/282 |
| 4,308,893 A * | 1/1982 | Shore | ............... | B62D 11/08 137/596.14 |
| 4,319,608 A * | 3/1982 | Raikov | ............... | F16K 3/34 137/625.48 |
| 4,407,328 A * | 10/1983 | Shore | ............... | B62D 11/08 137/596.14 |
| 4,476,748 A * | 10/1984 | Morscheck | ............ | F16H 3/006 477/122 |
| RE33,053 E * | 9/1989 | Seger | ............... | F16K 47/04 251/121 |
| 4,941,508 A * | 7/1990 | Hennessy | ........... | F16K 11/0708 137/625.69 |
| 5,193,584 A * | 3/1993 | Watts | ............... | F16K 3/34 137/625.3 |
| 6,450,194 B1 * | 9/2002 | Wasson | ............ | F15B 13/0402 137/351 |
| 6,460,561 B1 * | 10/2002 | Ebinger | ............. | F15B 13/0402 137/331 |
| 6,581,902 B2 * | 6/2003 | Michau | ............... | F16K 47/12 138/42 |
| 10,422,437 B2 * | 9/2019 | Ishikawa | ............ | F16K 99/0001 |
| 2002/0027212 A1 * | 3/2002 | Johnson | ............... | B67D 3/045 251/126 |
| 2012/0175540 A1 * | 7/2012 | Hase | ............... | F16K 31/0613 251/129.15 |

FOREIGN PATENT DOCUMENTS

| | | |
|---|---|---|
| JP | S63-21703 U | 2/1988 |
| JP | S63-036768 U | 3/1988 |
| JP | H02-040140 B2 | 9/1990 |
| JP | H03-51284 U | 5/1991 |
| JP | H5-064401 U | 8/1993 |
| JP | H6-101413 A | 4/1994 |
| JP | H07-088741 B2 | 9/1995 |
| JP | H9-119530 A | 5/1997 |
| JP | 2986148 B2 | 12/1999 |
| JP | 2001-55903 A | 2/2001 |
| JP | 2001-241559 A | 9/2001 |
| KR | 100995305 B1 | 11/2010 |

OTHER PUBLICATIONS

International Search Report issued in corresponding International Application No. PCT/JP2015/085308 dated Mar. 22, 2016, with translation (5 pages).
International Preliminary Report on Patentability issued in corresponding International Application No. PCT/JP2015/085308 dated Jun. 19, 2018, with translation (12 pages).

* cited by examiner

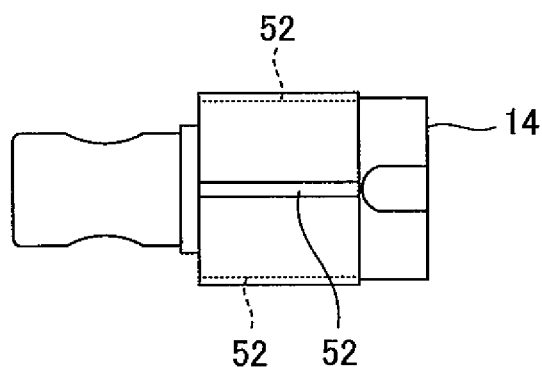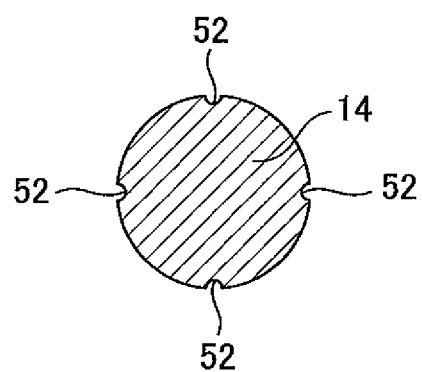

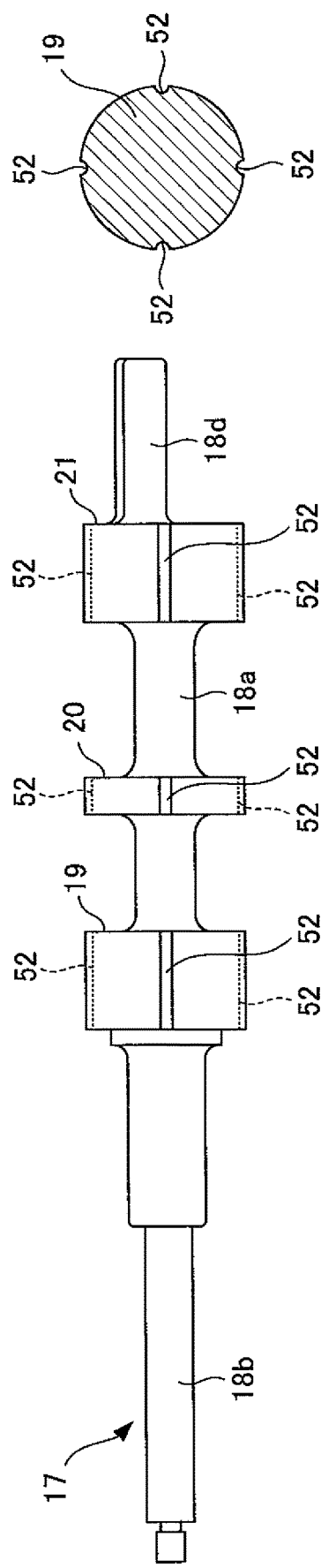

EMERGENCY SHUT-OFF DEVICE

TECHNICAL FIELD

The present invention relates to an emergency shut-off device for urgently stopping a steam turbine.

BACKGROUND

An emergency shut-off device is installed to immediately close the trip-and-throttle valve (hereinafter called the TTV) to urgently stop a steam turbine in case of an emergency (such as an overspeed, an excessive shaft vibration, or the like) which prevents safe operation of the steam turbine has occurred.

PATENT DOCUMENT

Patent Document 1: Japanese Patent Application Publication No. Hei 9-119530
Patent Document 2: Japanese Utility Model Registration Application Publication No. Hei 5-64401

FIG. 10 illustrates a conventional emergency shut-off device, and FIGS. 11 and 12 illustrate a trip system including the conventional emergency shut-off device. Note that FIG. 11 illustrates a state in normal operation (during operation of a steam turbine), and FIG. 12 illustrates a state at the time of tripping. The trip system illustrated in FIGS. 11 and 12 supplies and drains control oil to and from a TTV 31 and a governor valve (hereinafter called the GV) 32 of the steam turbine (not illustrated), using an emergency shut-off device 10B.

The emergency shut-off device 10B includes a trip piston 12 and a trip pilot valve 17 disposed in parallel with each other inside a cylinder 11. An end rod 13b on one end side (the left side in the figure) of a rod 13a of the trip piston 12 passes through the cylinder 11 and is exposed to the outside. Provided at the end of the end rod 13b is a trip button 13c. Provided on the other end side (the right side in the figure) of the rod 13a is a piston valve 14, from which an end rod 13d extends. The end rod 13d passes through the cylinder 11 and is exposed to the outside. The end of the end rod 13d is in contact with a lever portion 16a of a cam 16. In addition, the rod 13a is provided with a spring 15 which applies a biasing force to the rod 13a in the direction toward the cam 16.

An end rod 18b on one end side (the left side in the figure) of a rod 18a of the trip pilot valve 17 also passes through the cylinder 11 and is exposed to the outside. Provided at the end of the end rod 18b is a reset button 18c. The rod 18a is provided with multiple piston valves 19 to 21 spaced at predetermined intervals. An end rod 18d on the other side (the right side in the figure) of the rod 18a also extends from the piston valve 21, passes through the cylinder 11, and is exposed to the outside. The end of the end rod 18d is in contact with a latch portion 16b of the cam 16. In addition, the end rod 18b is provided with a spring 22 which applies a biasing force to the end rod 18b in the direction toward the cam 16.

The cylinder 11 has a port 23 on the trip piston 12 side, and the piston valve 14 forms a chamber 24. The cylinder 11 also has ports 25a to 25f on the trip pilot valve 17 side. The piston valve 19 forms a chamber 26a, the piston valve 19 and the piston valve 20 form a chamber 26b, the piston valve 20 and the piston valve 21 form a chamber 26c, and the piston valve 21 forms a chamber 26d.

On the trip piston 12 side, the control oil is supplied to and drained from the chamber 24 via the port 23. On the trip pilot valve 17 side, air is discharged or the control oil is drained from the inside of the chamber 26a via the port 25a, air is discharged or the control oil is drained from the chamber 26a or the chamber 26b via the port 25b, the control oil is supplied to and drained from the chamber 26b (supplied to and drained from the GV 32) via the port 25c, the control oil is supplied to the chamber 26b or the chamber 26c via the port 25d, the control oil is supplied to and drained from the chamber 26c (supplied to and drained from the TTV 31) via the port 25e, and air is discharged or the control oil is drained from the chamber 26c or the chamber 26d via the port 25f.

A pipe for supplying the control oil from the supply source of the control oil is connected to the port 25d and also connected to the port 23 via an orifice 34. A pipe for supplying and draining the control oil to and from the GV 32 is connected to the port 25c, and a pipe for supplying and draining the control oil to and from the TTV 31 is connected to the port 25e.

In addition, the port 23 is connected to a drain device 35. This drain device 35 includes two drainage lines having the same configuration and connected in parallel (duplex). Each drainage line includes a valve 36, a valve 37 and orifice 38 connected in parallel with the valve 36, and a solenoid valve 39 connected downstream (on the draining side) of the valve 36, valve 37, and orifice 38.

In the trip system described above, in normal operation, the solenoid valves 39 are closed, and thus, the control oil is supplied to the port 23 via the orifice 34 and also supplied to the port 25d, as illustrated in FIG. 11. Note that in FIG. 11, solid line arrows indicate pipes under hydraulic pressure, and broken line arrows indicate pipes without hydraulic pressure.

Thus, in normal operation, the chamber 24 is under hydraulic pressure via the orifice 34, and the hydraulic pressure of the chamber 24 opposes the biasing force of the spring 15, which prevents the trip piston 12 from moving toward the cam 16. Accordingly, the latch portion 16b of the cam 16 also prevents the trip pilot valve 17 from moving toward the cam 16.

In such normal operation, the control oil supplied to the port 25d is then supplied to the TTV 31 via the chamber 26c and the port 25e. In addition, the control oil from the GV 32 is drained via the port 25c, the chamber 26b, and the port 25b.

On the other hand, at the time of tripping, the solenoid valves 39 are open, and the control oil is not supplied to the port 23 (no hydraulic pressure in the chamber 24), but supplied only to the port 25d, as illustrated in FIG. 12. Note that also in FIG. 12, solid line arrows indicate pipes under hydraulic pressure, and broken line arrows indicate pipes without hydraulic pressure.

At the time of tripping, since the solenoid valves 39 are open, and no hydraulic pressure is applied to the chamber 24, the biasing force of the spring 15 moves the trip piston 12 toward the cam 16. Accordingly, the end of the end rod 13d pushes the lever portion 16a, turning the cam 16, and the end of the end rod 18d comes off the latch portion 16b. As a result, the biasing force of the spring 22 moves the trip pilot valve 17 toward the cam 16.

Note that in the case where the solenoid valves 39 do not open, pushing the trip button 13c can cause the end of the end rod 13d to push the lever portion 16a to turn the cam 16, which in turn causes the end of the end rod 18d to come off the latch portion 16b. As a result, it is possible to move the trip pilot valve 17 toward the cam 16.

At the time of tripping described above, the control oil supplied to the port 25d is then supplied to the GV 32 via the chamber 26b and the port 25c. The control oil from the TTV 31 is drained via the port 25e, the chamber 26c, and the port 25f.

In the emergency shut-off device 10B of the trip system described above, the control oil and the springs 15 and 22 are used to operate the trip piston 12 and the trip pilot valve 17. However, in the case where stagnation and deterioration of the control oil used cause sludge, the sludge may clog the sliding surfaces (portions indicated with symbols A in FIG. 10) of the piston valves 14, and 19 to 21, and cause the trip piston 12 and the trip pilot valve 17 to adhere to the cylinder 11, preventing them from moving.

SUMMARY

One or more embodiments of the invention provide an emergency shut-off device capable of preventing the occurrence of sludge to achieve reliable operation.

One or more embodiments of the invention are directed to an emergency shut-off device that shuts off supply of control oil to a trip-and-throttle valve of a steam turbine and closes the trip-and-throttle valve in an emergency, the emergency shut-off device comprising:

a cylinder; a piston which slides in the cylinder; a spring which applies a biasing force to the piston; a plurality of piston valves disposed on the piston; and a plurality of chambers which are formed by the piston valves, and which the control oil is supplied to and drained from, wherein a sliding surface of each of the piston valves has a groove to leak the control oil in the chambers.

One or more embodiments of the invention are directed to an emergency shut-off device wherein the groove is a spiral groove formed on the sliding surface of each of the piston valves.

One or more embodiments of the invention are directed to an emergency shut-off device wherein the groove is a linear groove formed on the sliding surface of each of the piston valves and extending along an axis direction of the piston.

One or more embodiments of the invention are directed to an emergency shut-off device wherein a depth of the groove is 1.0 mm or less.

One or more embodiments of the invention are directed to an emergency shut-off device wherein the piston includes a first piston and a second piston which, when the first piston moves from a position in normal operation to a position in the emergency, moves from a position in the normal operation to a position in the emergency in an interlocked fashion, and the chambers include at least a movement chamber which is formed by the piston valve of the first piston and drains the control oil in the emergency to move the first piston from the position in the normal operation to the position in the emergency and a trip-and-throttle valve chamber which is formed by the piston valve of the second piston, supplies the control oil to the trip-and-throttle valve when the second piston is at the position in the normal operation, and drains the control oil from the trip-and-throttle valve when the second piston is at the position in the emergency.

One or more embodiments of the present invention prevent the occurrence of sludge to achieve reliable operation, and thus improves the reliability of the trip operation of the trip-and-throttle valve.

BRIEF DESCRIPTION OF DRAWINGS

FIG. 8 A is a diagram explaining a modification of the piston valve of the trip piston illustrated in FIG. 2.

FIG. 8B is a diagram explaining a modification of the piston valve of the trip piston illustrated in FIG. 2.

FIG. 9A is a diagram explaining a modification of the piston valve of the trip pilot valve illustrated in FIG. 3.

FIG. 9B is a diagram explaining a modification of the piston valve of the trip pilot valve illustrated in FIG. 3 according to one or more embodiments.

DETAILED DESCRIPTION

Hereinafter, embodiments of an emergency shut-off device according to the present invention will be described. with reference to FIGS. 1 to 9B. Note that although here the TTV and the GV of a steam turbine are described as examples of control targets of the emergency shut-off device, the extraction control valve (ECV) may be further added as a control target.

Example 1

Figure 1:
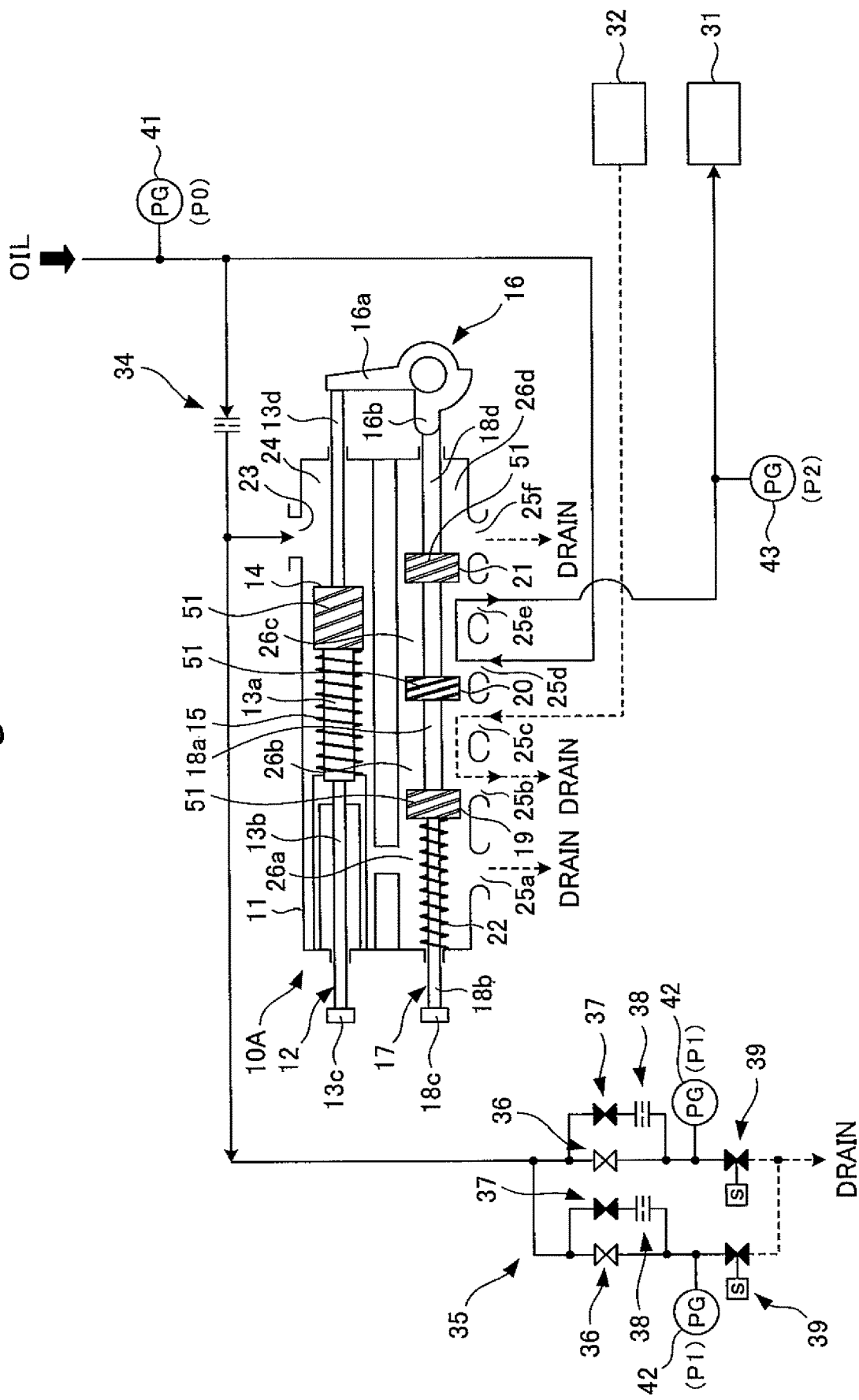
FIG. 1 is a schematic diagram illustrating a trip system for a steam turbine having an emergency shut-off device according to one or more embodiments of the present invention, with the trip system in normal operation.
Figure 10:
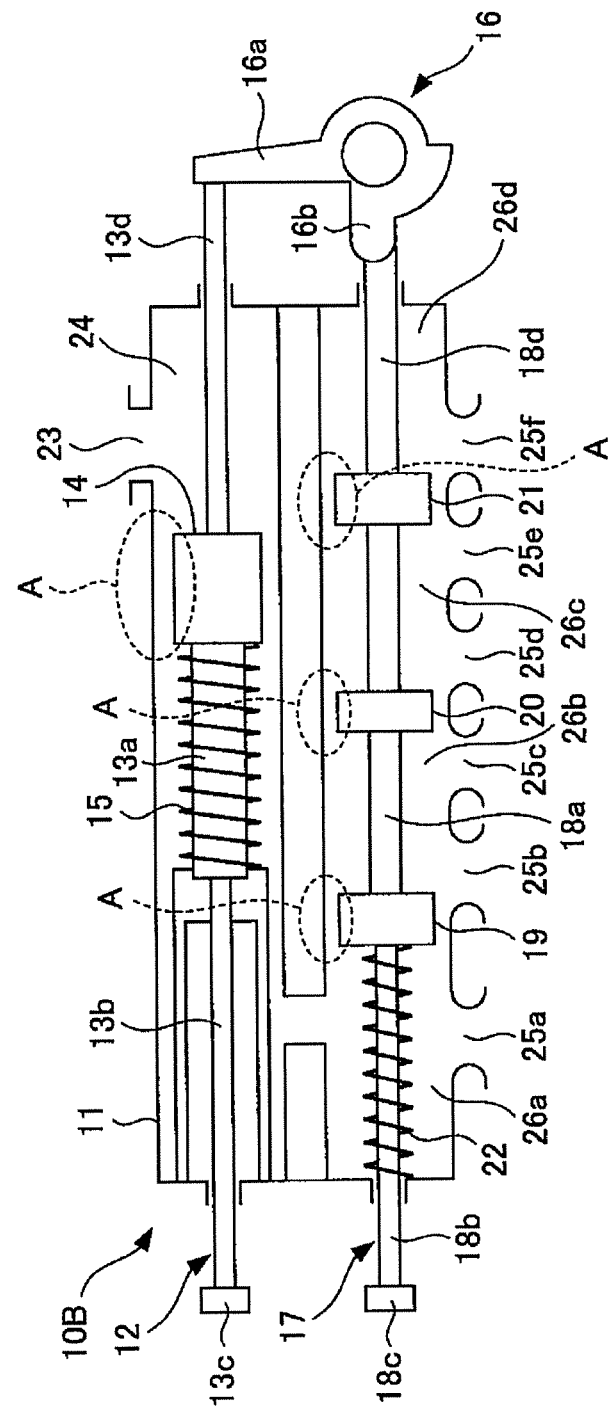
FIG. 10 is a schematic diagram illustrating a conventional emergency shut-off device.
Figure 11:
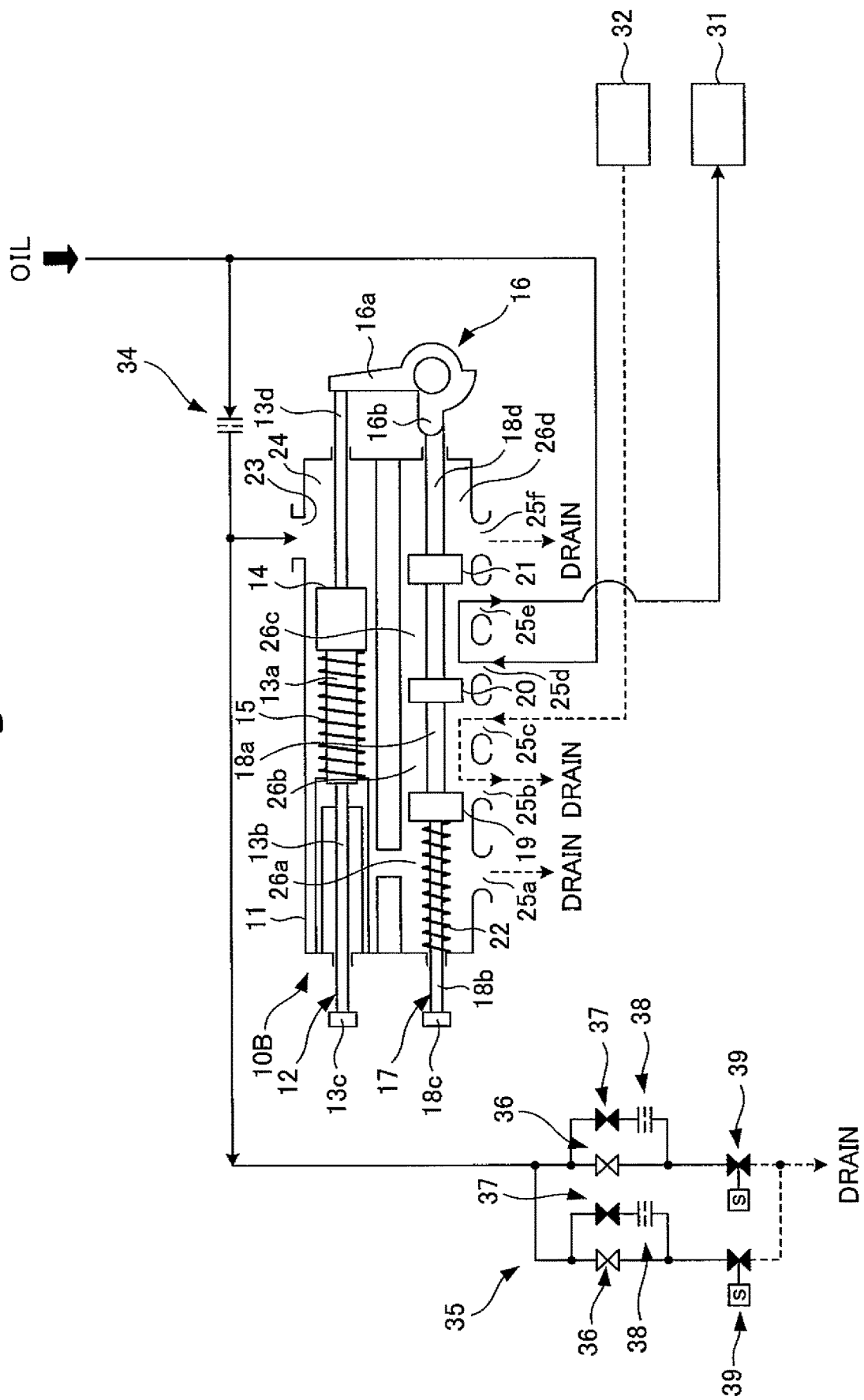
FIG. 11 is a schematic diagram illustrating a trip system of a steam turbine having the conventional emergency shut-off device illustrated in FIG. 10, with the trip system in normal operation.
Figure 12:
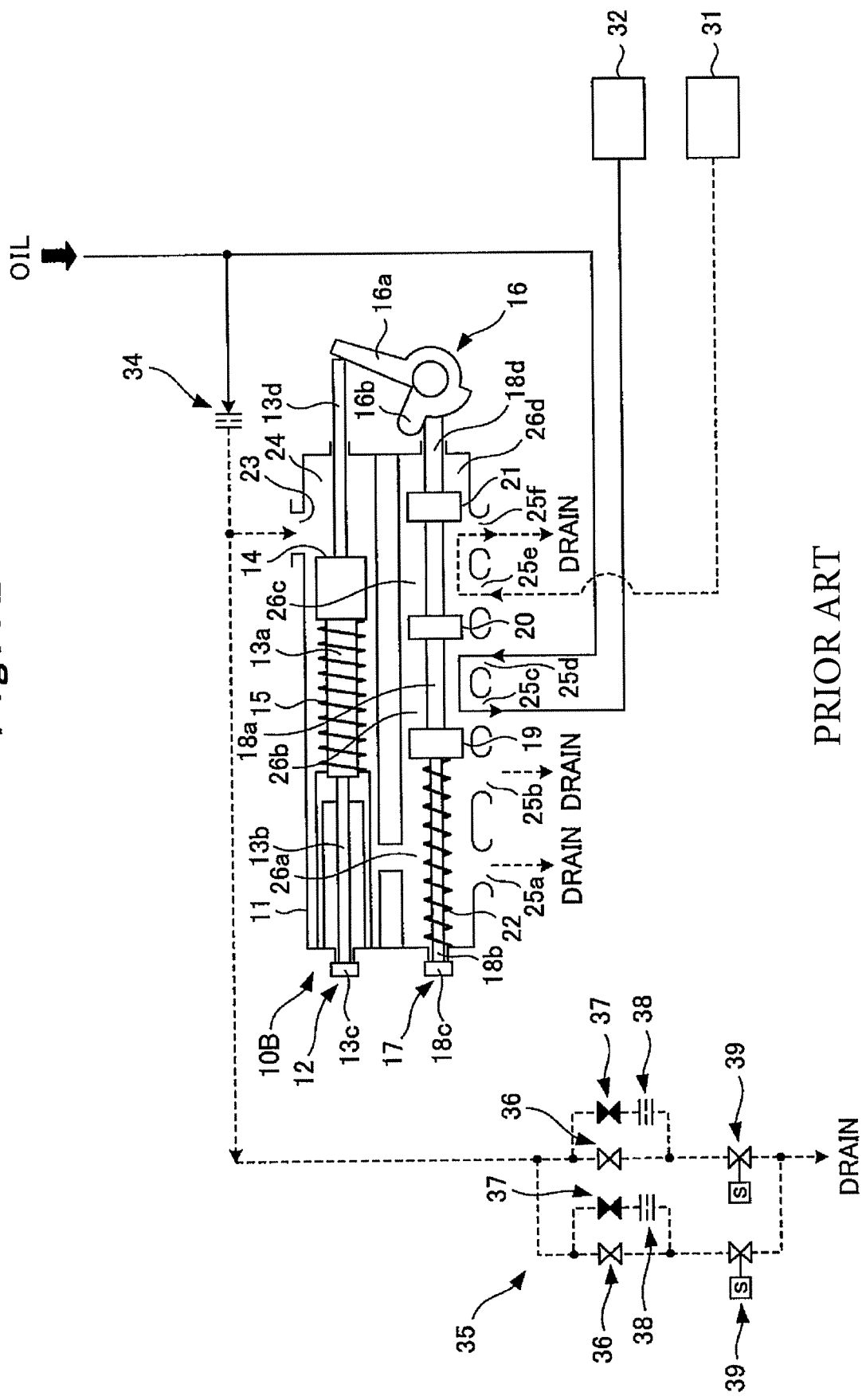
FIG. 12 is a schematic diagram illustrating the trip system of the steam turbine illustrated in FIG. 11 at the time of tripping.

A trip system having an emergency shut-off device according to this example is illustrated in FIG. 1. The emergency shut-off device 10A according to this example basically has substantially the same configuration as that of the conventional emergency shut-off device 10B illustrated in FIGS. 10 to 12, and a trip system having the emergency shut-off device 10A also has almost the same configuration as that of the conventional emergency shut-off device 10B. Thus, here the same constitutes are denoted by the same symbols, and repetitive descriptions thereof are omitted.

The trip system illustrated in FIG. 1 supplies and drains control oil to and from a TTV 31 and a GV 32 of a steam turbine (not illustrated) using the emergency shut-off device 10A according to this example, and shuts off the supply of the control oil to close the TTV 31 in an emergency (trip operation). Note that although FIG. 1 illustrates the trip system during the normal operation (during the operation of the steam turbine), this trip system gets into the same state as that of the trip system illustrated in FIG. 12 at the time of tripping.

Note that the emergency shut-off device 10A according to this example includes as constituents a cylinder 11; a trip piston 12 (second piston) and a trip pilot valve 17 (first piston) which are pistons sliding in the cylinder 11; springs 15 and 22 applying biasing forces to the trip piston 12 and the trip pilot valve 17; piston valves 14, and 19 to 21 disposed on the trip piston 12 and the trip pilot valve 17; and chambers 24, and 26a to 26d formed by the piston valves 14, and 19 to 21, and through which control oil is supplied and drained.

When the trip piston 12 moves from a position in normal operation (normal position) to a position in an emergency (emergency position), a cam 16 turns, which disengages the end of an end rod 18d from a latch portion 16b. As a result, the biasing force of the spring 22 moves the trip pilot valve 17 from a position in normal operation to a position in an emergency in an interlocked fashion.

The chamber 24 (movement chamber) is formed by the piston valve 14 of the trip piston 12. When the control oil is drained from a port 23 in an emergency, the biasing force of the spring 15 moves the trip piston 12 from the position in normal operation to the position in an emergency.

The chamber 26b (governor valve chamber) is formed by the piston valve 19 and the piston valve 20 of the trip pilot valve 17. When the trip pilot valve 17 is at the position in normal operation, the chamber 26b connects a port 25b and a port 25c to each other to drain the control oil from the GV 32. When the trip pilot valve 17 is at the position in an emergency, the chamber 26b connects the port 25c and a port 25d to each other to supply the control oil to the GV 32 (see FIG. 12).

The chamber 26c (trip-and-throttle valve chamber) is formed by the piston valve 20 and the piston valve 21 of the trip pilot valve 17. When the trip pilot valve 17 is at the position in normal operation, the chamber 26c connects the port 25d and a port 25e to supply the control oil to the TTV 31. When the trip pilot valve 17 is at the position in an emergency, the chamber 26c connects the port 25e and a port 25f to each other to drain the control oil from the TTV 31 (see FIG. 12). Note that the chambers 26a and 26d drain the control oil or discharge air along with the movement of the trip pilot valve 17.

The control oil used in the emergency shut-off device 10A of such a trip system may stagnate or deteriorate, and cause sludge, which clogs the sliding surfaces of the piston valves 14, and 19 to 21 of the trip piston 12 and the trip pilot valve 17 and causes them to adhere to the cylinder 11, resulting in malfunctioning.

Figure 2:
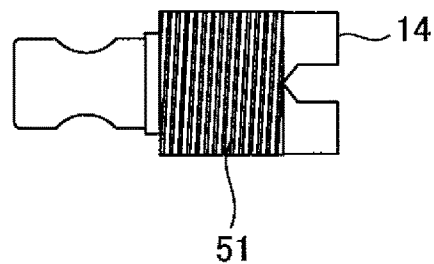
FIG. 2 is a diagram explaining an example of a piston valve of a trip piston in the emergency shut-off device illustrated in FIG. 1.
Figure 3:
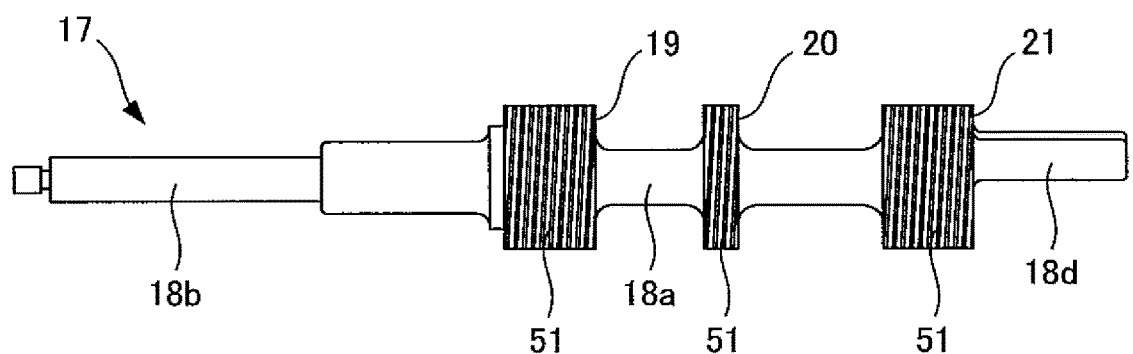
FIG. 3 is a diagram explaining an example of a piston valve of a trip pilot valve in the emergency shut-off device illustrated in FIG. 1.
Figure 4:
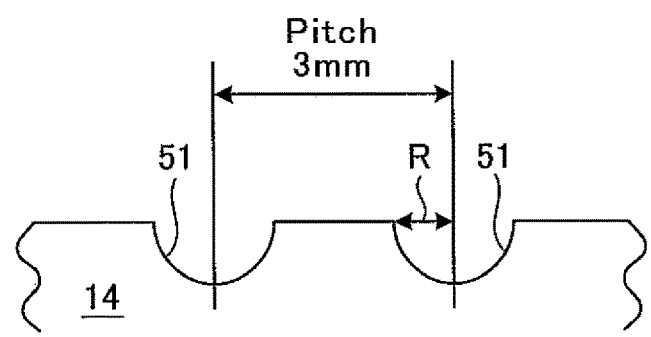
FIG. 4 is an enlarged view of the piston valve illustrated in FIG. 2.

For this reason, in the emergency shut-off device 10A according to this example, as also illustrated in FIGS. 2 to 4, each of the piston valves 14, and 19 to 21 has a spiral groove 51 formed on the sliding surface thereof as if the spiral groove 51 is wound around the sliding surface. Note that FIG. 4 is an enlarged view of a portion of the sliding surface of the piston valve 14 illustrated in FIG. 2. This spiral groove 51 is used to intentionally keep leaking a small amount of the control oil to prevent the control oil from stagnating or deteriorating, and thus preventing the occurrence of sludge.

Figure 5:
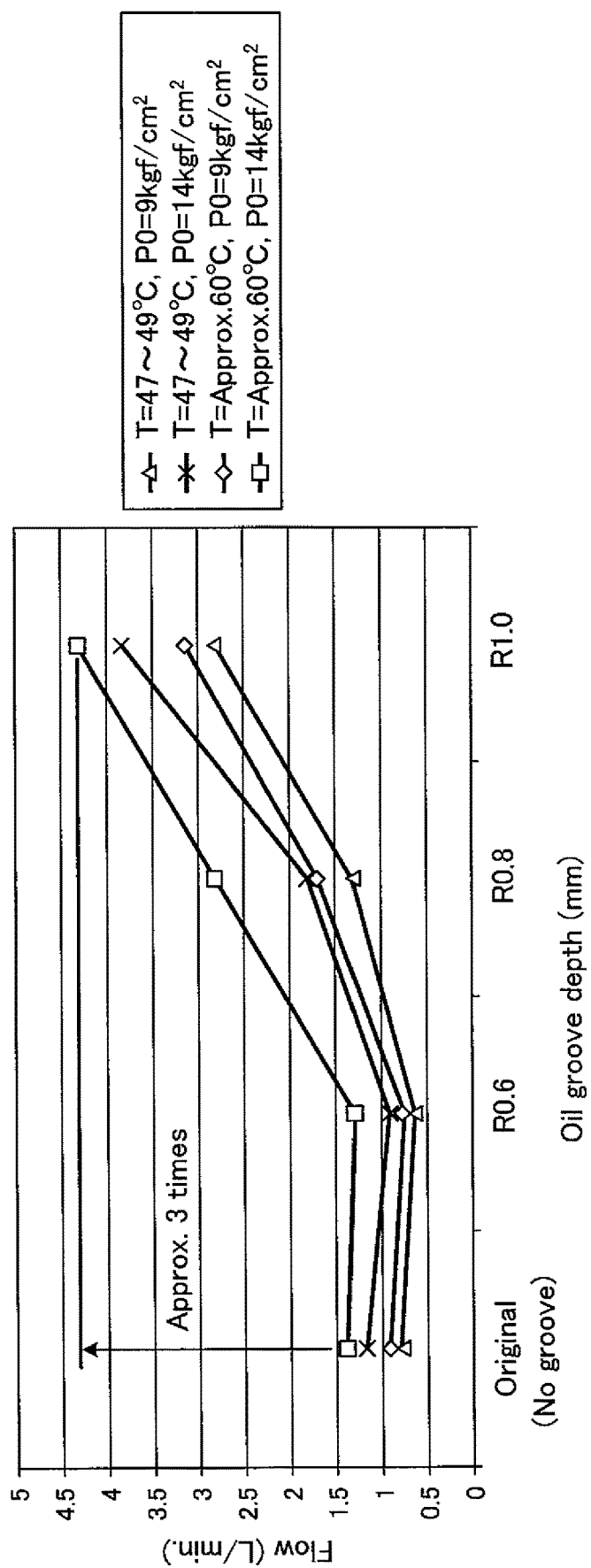
FIG. 5 is a graph comparing the amount of leakage of control oil in a trip system of a steam turbine according to one or more embodiments.
Figure 6:
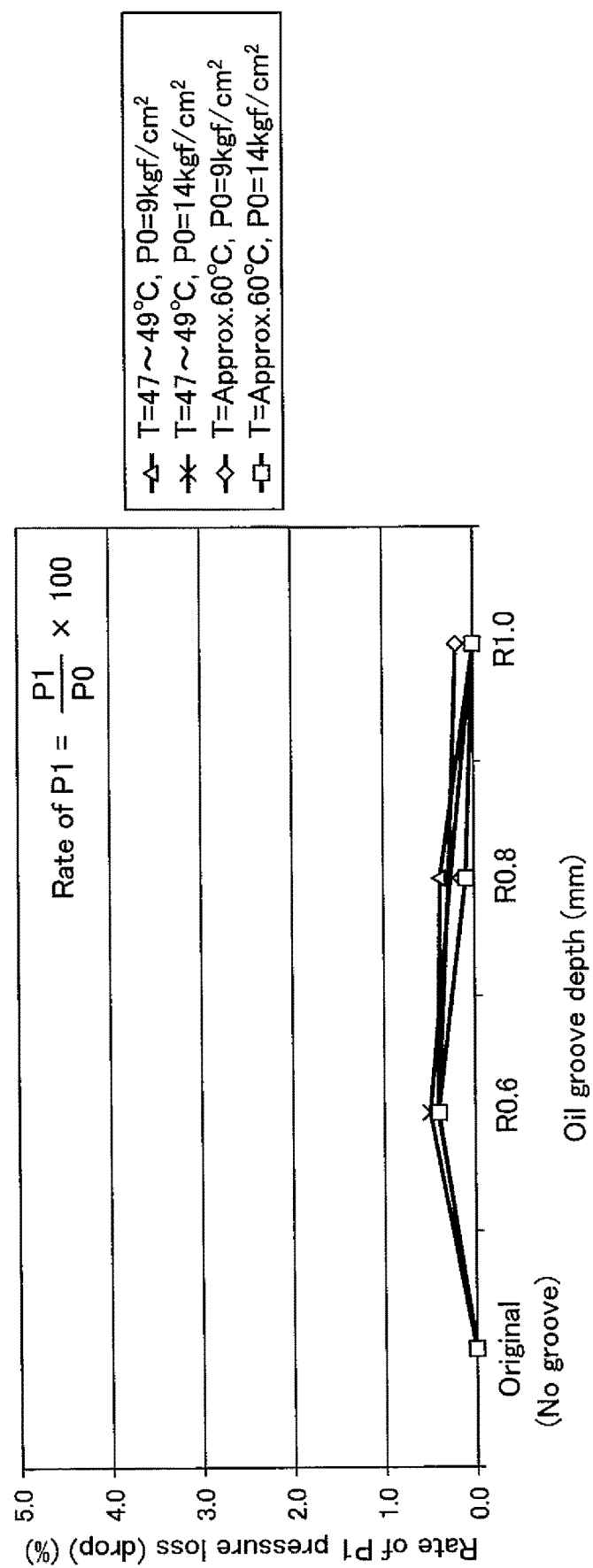
FIG. 6 is a graph comparing the amount of pressure loss of the control oil at a pipe in a drain device in the trip system of the steam turbine according to one or more embodiments.
Figure 7:
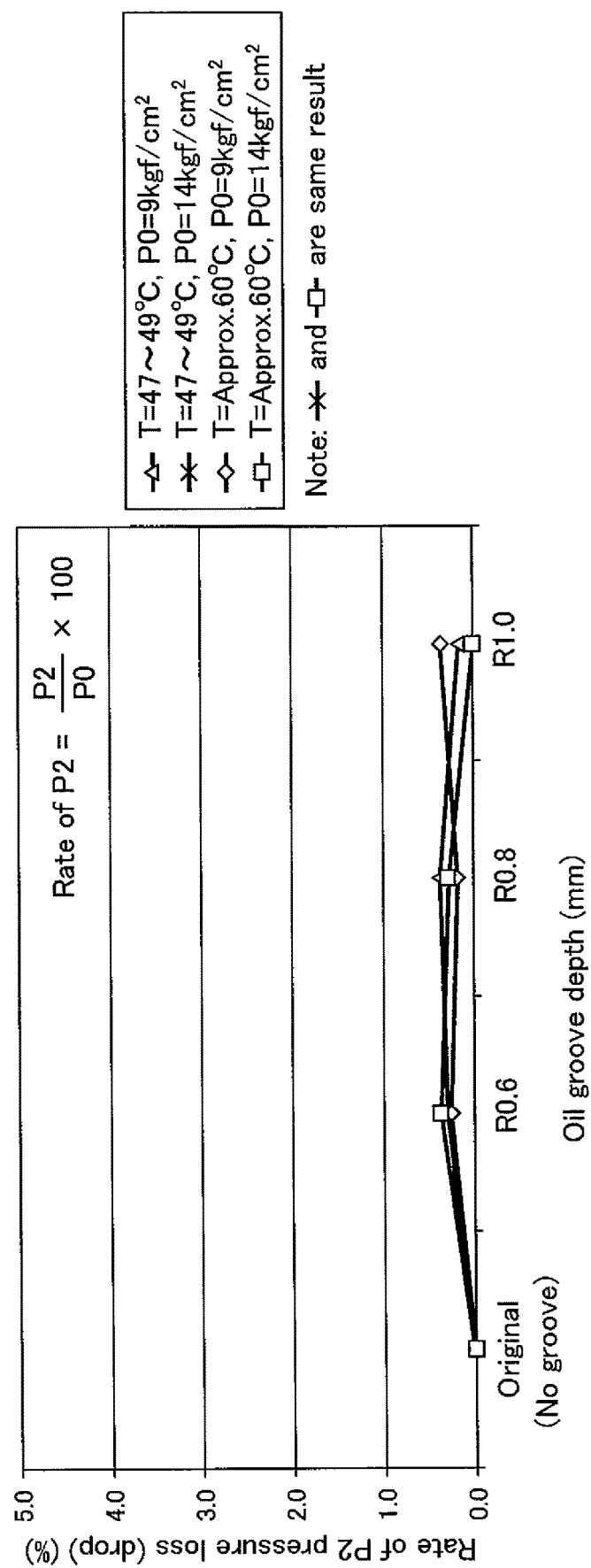
FIG. 7 is a graph comparing the amount of pressure loss of the control oil at a pipe for a trip-and-throttle valve in the trip system of the steam turbine according to one or more embodiments.

Graphs illustrated in FIGS. 5 to 7 show the comparison between the result of a test performed with a trip system having the conventional emergency shut-off device 10B and the result of a test performed with a trip system having the emergency shut-off device 10A according to this example.

The data indicated by "Original" in FIGS. 5 to 7 are the results of the test performed with the trip system having the conventional emergency shut-off device 10B. In the conventional emergency shut-off device 10B, the sliding surface of each of the piston valves 14, and 19 to 21 does not have a groove. The data indicated by "R0.6", "R0.8", and "R1.0" are the results of the tests performed with the trip system having the emergency shut-off device 10A according to this example. Referring to FIG. 4, in the test conditions, the pitch of the spiral groove 51 in all specimens is 3 mm, and the radius R indicating the depth of the spiral groove 51 in the specimen "R0.6" is R=0.6 mm; in the specimen "R0.8", R=0.8 mm; and in the specimen "R1.0", R=1.0 mm.

In addition, in the test conditions, the temperatures T of the control oil supplied were of two kinds: T=47 to 49° C. (temperature in the normal supply range) and T=about 60° C. (temperature of use limit), and the pressures P0 of the control oil supplied were of two kinds: P0=9 kgf/cm$^2$ and P0=14 kgf/cm$^2$. Combining these conditions, the test was performed in four conditions in total. Note that the pressure P0 is the pressure at a pressure gauge 41 illustrated in FIG. 1.

Then, measured as test items were the amount of oil leakage (FIG. 5) and the amount of pressure loss (FIGS. 6 and 7). Here, FIG. 6 indicates P1/P0×100 as the amount of decrease in the pressure P1 based on the above P0 and the pressure P1 measured with pressure gauges 42 illustrated in FIG. 1, and FIG. 7 indicates P2/P0×100 as the amount of decrease in the pressure P2 based on the above P0 and the pressure P2 measured with a pressure gauge 43 illustrated in FIG. 1. Note that as illustrated in FIG. 1, the pressure gauges 42 are disposed on pipes in a drain device 35 (each between a valve 36 and orifice 38 and a solenoid valve 39), and the pressure gauge 43 is disposed on a pipe between the emergency shut-off device 10A and the TTV 31.

As illustrated in the graph of FIG. 5, the deeper the groove is (the larger the radius R is), the larger the leakage amount of the control oil is. In the case of "R1.0" (the groove depth is 1.0 mm), the leakage amount of the control oil is about three times that of "Original" (no groove).

On the other hand, as illustrated in the graphs of FIGS. 6 and 7, even though the oil leakage amount increases, the pressure loss amount of the control oil does not decrease largely. The amounts of decreases in the pressures P1 and P2 was 1% or less of the pressure P0 in any condition.

As described above, if the depth R of the spiral groove 51 is about 1.0 mm or less, the pressure loss between before and after the emergency shut-off device 10A can be suppressed to be smaller than or equal to 1%. In other words, the depth R of the spiral groove 51 only needs to be 1.0 mm or less.

Note that as illustrated in FIGS. 8A and 8B, instead of the spiral groove 51 illustrated in FIGS. 2 and 3, multiple linear grooves 52 extending along the axis direction of the rod 13a may be formed on the sliding surface of the piston valve 14, and as illustrated in FIGS. 9A and 9B, multiple linear grooves 52 extending along the axis direction of the rod 18a may be formed on the sliding surface of each of the piston valves 19 to 21. Here, as an example, on the sliding surface of each of the piston valves 14, 19 to 21 are formed four linear grooves 52 at intervals of 90°. The linear grooves 52 illustrated in FIGS. 8A, 8B, 9A and 9B also provide the same effects as those of the spiral groove 51 illustrated in FIGS. 2 and 3.

In addition, all the piston valves 14, and 19 to 21 do not have to have the same groove. The spiral groove 51 and the linear grooves 52 may be combined such that some piston valves have the spiral groove 51, and the other piston valves have the linear grooves. Further, the spiral grooves 51 and the liner grooves 52 may have different depths within the range of 1.0 mm or less.

INDUSTRIAL APPLICABILITY

One or more embodiments of the present invention is suitable to steam turbines for driving compressors or the like.

REFERENCE SIGNS LIST 10A emergency shut-off device
12 trip piston
14 piston valve
15 spring
17 trip pilot valve
19, 20, 21 piston valve
22 spring
31 TTV
51 spiral groove
52 linear groove Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An emergency shut-off device that shuts off supply of control oil to a trip-and-throttle valve of a steam turbine and closes the trip-and-throttle valve in an emergency, the emergency shut-off device comprising:
 a cylinder;
 a first piston that slides into the cylinder;
 a spring that applies a biasing force to the first piston;
 a plurality of piston valves disposed on the first piston; and
 a plurality of chambers that are formed by the piston valves, wherein
the control oil is supplied to and drained from the plurality of chambers,
a sliding surface of each of the piston valves has a spiral groove to leak the control oil in a corresponding one of the chambers to another one of the chambers that is adjacent to the corresponding chamber in an axis direction,
the plurality of piston valves includes:
 a first piston valve disposed on a first end side of the first piston in the axis direction;
 a second piston valve disposed on a second end side of the first piston in the axis direction; and
 a third piston valve between the first piston valve and the second piston valve,
a length of the third piston valve in the axis direction is shorter than a length of the first piston valve and a length of the second piston valve in the axis direction,
the spiral groove is formed on the sliding surface of each of the piston valves, and the spiral groove has an arc cross section when cut along a cutting surface intersecting an extending direction of the spiral groove,
a pitch of the spiral groove is 3 mm,
a depth of the spiral groove is greater than 0.6 mm and less than or equal to 1.0 mm, and
the emergency shut-off device further comprises:
 a second piston; and
 a cam that is in contact with the first piston and the second piston, wherein
 in response to the first piston moving from a normal position during normal operation to an emergency position, the cam rotates and interlocks the first piston with the second piston by moving the second piston from a normal position during the normal operation to an emergency position.

2. The emergency shut-off device according to claim 1, wherein
the plurality of chambers includes:
a movement chamber that is formed by a piston valve of the second piston, and drains the control oil during the emergency to move the second piston from the normal position to the emergency position; and
a trip-and-throttle valve chamber that is formed by the piston valve of the first piston, supplies the control oil to the trip-and-throttle valve when the first piston is at the normal position, and drains the control oil from the trip-and-throttle valve when the first piston is in the emergency position.

* * * * *